United States Patent [19]

Fransen

[11] Patent Number: 5,547,004
[45] Date of Patent: Aug. 20, 1996

[54] METHOD AND DEVICE FOR ARRANGING A STREAM OF PRODUCTS

[75] Inventor: A. A. Joseph Fransen, Vlaardingen, Netherlands

[73] Assignee: Klockner Hansel Tevopharm B.V., Schiedam, Netherlands

[21] Appl. No.: 256,946

[22] PCT Filed: Jan. 28, 1993

[86] PCT No.: PCT/NL93/00029

§ 371 Date: Jul. 27, 1994

§ 102(e) Date: Jul. 27, 1994

[87] PCT Pub. No.: WO93/15005

PCT Pub. Date: Aug. 5, 1993

[30] Foreign Application Priority Data

Feb. 11, 1992 [NL] Netherlands ............................ 920047
Jan. 28, 1993 [NL] Netherlands ............................ 9200154

[51] Int. Cl.$^6$ .................................................. B65G 47/26
[52] U.S. Cl. ...................... 198/419.3; 198/460.2
[58] Field of Search .................. 198/594, 418.7, 198/419.2, 419.3, 429, 460.1, 460.3, 462.3, 464.2

[56] References Cited

U.S. PATENT DOCUMENTS 2,884,115 4/1959 Farrer .
5,070,993 10/1991 Fransen ............................ 198/419.3
5,070,995 10/1991 Schaffer ............................ 198/460.1

FOREIGN PATENT DOCUMENTS

| 0418938 | 3/1991 | European Pat. Off. . |
| 2333734 | 3/1975 | Germany . |
| 3147590 | 6/1983 | Germany . |
| 4002724 | 8/1991 | Germany . |
| 523172 | 7/1972 | Switzerland . |

*Primary Examiner*—William E. Terrell
*Assistant Examiner*—Tamara Kelly
*Attorney, Agent, or Firm*—Young & Thompson

[57] ABSTRACT

Method for arranging a series of products (17, 106) which are moving in succession in the downstream direction along a conveyor belt (2, 103, 104), in such a way that they go into phase with a processing unit connected downstream. To control an activation element for arranging the products, before a product passes the element, the first speed Vx of the products upstream and the second speed Vy downstream of the element, the position Yn of the product processing unit, and the position Z of the element are measured. The distance Xn which is covered by the detected product from the above-mentioned position is determined. The required position Za of the element (9, 113) and the required speed Vya are calculated from Vx, Vy, Xn and Yn. The measured position Z and the measured second speed Vy are compared with the required position Za and the required position Za or the measured speed Vy and the required speed Vya, the element is moved or the second speed Vy is changed.

8 Claims, 6 Drawing Sheets

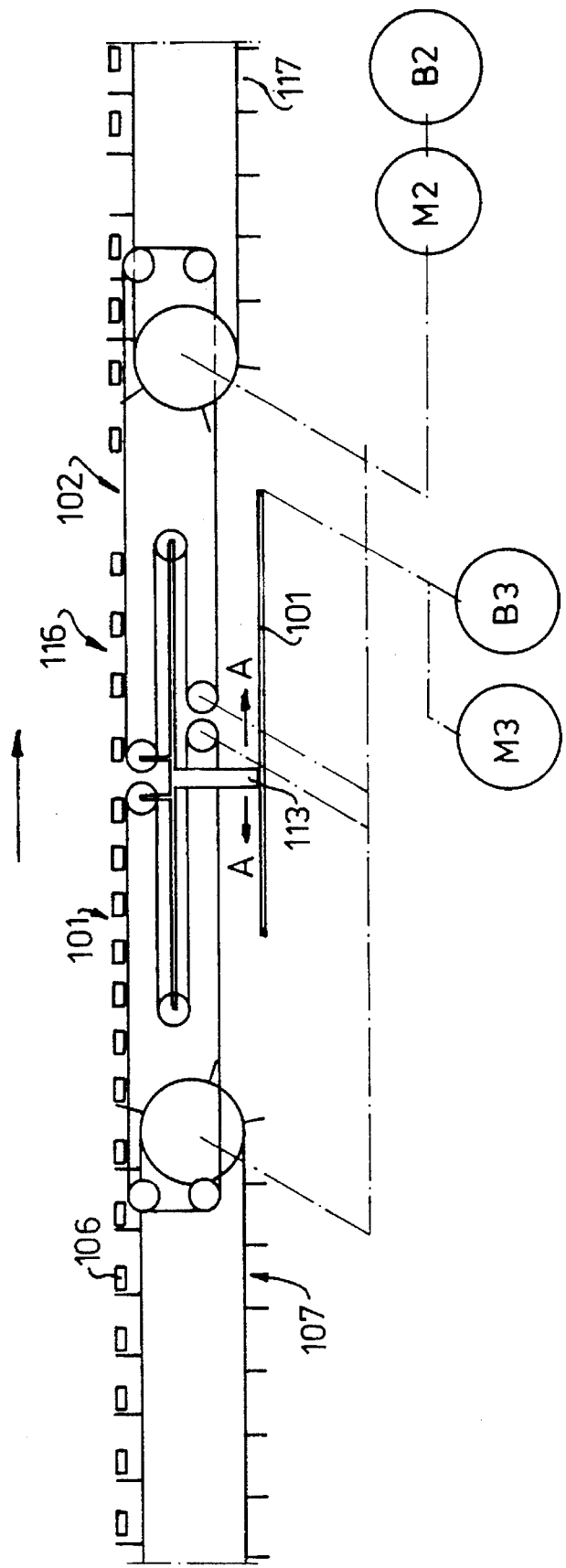

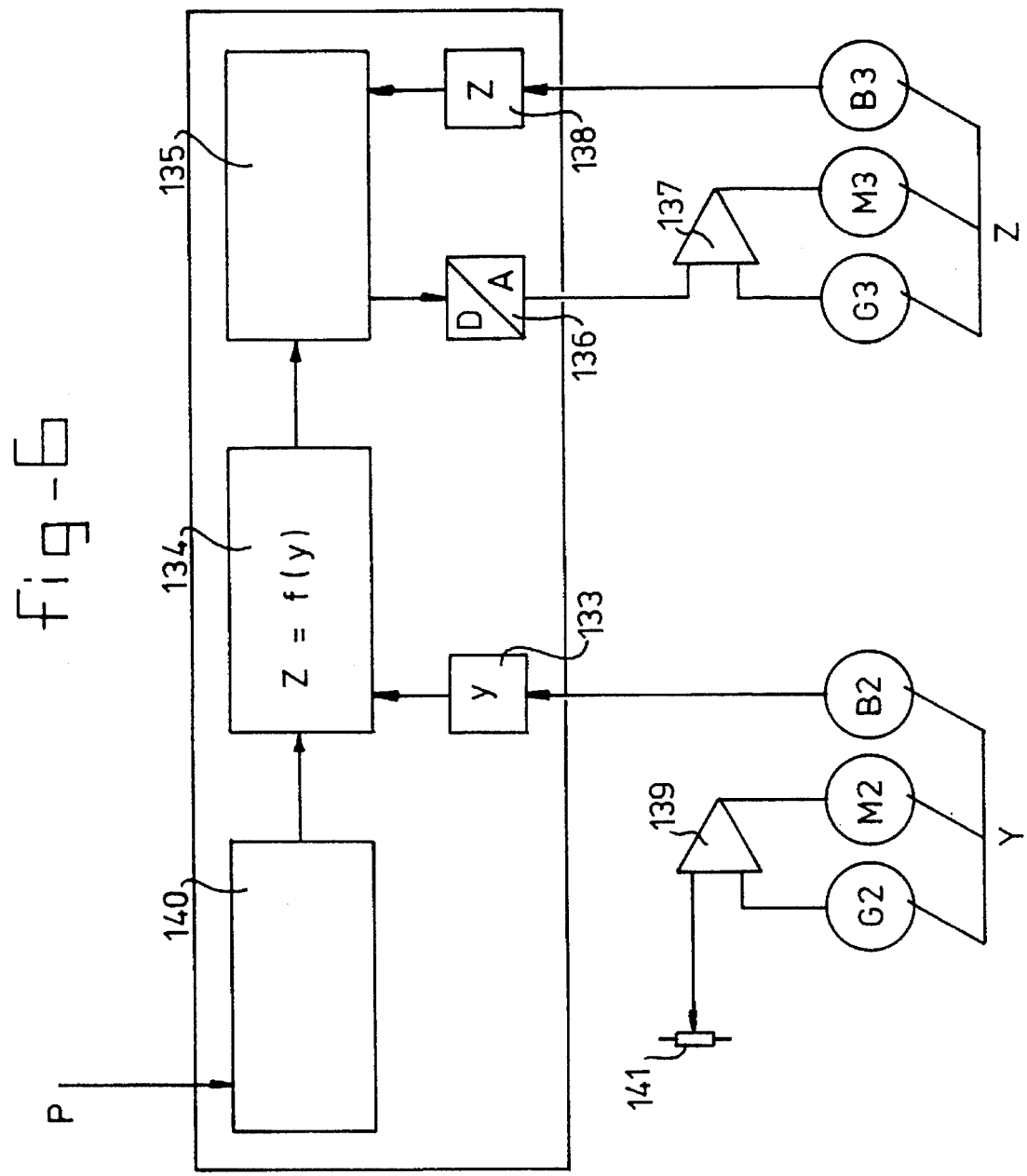

METHOD AND DEVICE FOR ARRANGING A STREAM OF PRODUCTS

The invention relates to a method for arranging a series of products which are moving in succession in a downstream direction along a conveyor at an essentially constant firs speed, said products passing a controlled activation element, which element is movable parallel to the products, and by means of which said series of products can be arranged, which element is controlled depending on a predetermined product upstream of the element passing a certain position, and in which said products, on passing said element, move along at an essentially constant second speed, and are arranged depending on a product processing unit situated downstream and operating in phase with the second speed. The invention also relates to a device for carrying out said method.

The present invention aims to cover a wide field of application, but the emphasis here is placed on the field of individual or combined packaging of products. This field covers many types of product, including sticky products which cannot tolerate being pushed together, such as pieces of cheese or thin bars of chocolate, or products of differing sizes.

One of the envisaged fields of application is the packaging of products in so-called multipacks. Such packs each contain a group of individually packaged articles. This group of individually packaged articles is packaged into multipacks in a multipack machine. For this, a continuous stream of individually packaged articles if fed to the multipack machine, in the course of which said individually packaged articles must be combined to form groups. For example, a production machine or a single-pack machine which is set up, for example, relatively close to the multipack machine. However, the articles can also be supplied from an intermediate stock, so that, for example, different production or single-pack machines can supply products to one multipack machine. The groups of products to be supplied to the multipack machine must have a constant product pitch. However, the stream of packaged articles with spacing between them, produced by, for example, a single-pack machine is not always constant. This is because, for example, packs which have been rejected are taken out of the stream, and because the production speed of a single-pack machine depends on the supply of articles to be supplied to it for individual packaging. Although most products consequently move up to the multipack machine with essentially little deviation relative to an average product pitch, great deviations from said average product pitch will regularly occur. An intelligent system is therefore required for grouping individually packaged products, since the products to be combined into a group do not need to lie a fixed distance apart for purposes of combination.

A device which operates according to the method described in the preamble is known from published unexamined Dutch Application 8902341. In this case the top part of an endless conveyor belt and the top part of an endless chain work in parallel at a distance from each other. The endless chain is driven at a slower speed than the conveyor belt. Products are supplied from a single-pack machine set up nearby, and a multipack machine is provided at the end of the conveyor belt. The speeds of the single-pack machine and the endless conveyor belt are synchronised, as are those of the endless chain and the multipack machine. This means that the product pitch is essentially constant, but the time interval at which products pass a certain point changes with the speed of the single-pack machine. Carriers with constant pitch are provided on the endless chain. A carrier is taken into the working position, or the position inserted between the products, by a pawl along which the carrier moves. The pawl in this case is designed so that it is movable parallel to the product stream, so that the place where the carrier is put into the working position can be adapted to the situation of the moving product stream. A detector (photoelectric cell) is situated, displaced slightly upstream, above the pawl and the photoelectric cell. The number of passing products is counted by the photoelectric cell. When the device is reset, the pawl with photoelectric cell will lie at virtually the same place when there is a virtually constant product supply. Each time that sufficient products have passed the photoelectric cell, a carrier passes the pawl immediately afterwards, and is placed in the working position. The control system in this case expects a group of products to pass the photoelectric cell within a certain time interval. If the group has not yet passed within that time interval, then pawl and photoelectric cell are shifted downstream, so that the moment of activation of the carrier is delayed. If the group passes earlier, pawl and photoelectric cell are shifted correspondingly upstream. Due to the fact that the carrier moves more slowly than the stream of individual products, individual products will be pushed up against a carrier which is in the working position. This causes the grouping to take place. If the photoelectric cell and pawl are sifted downstream, the movement of the carrier is simultaneously set at a lower speed, but this takes place with a delay, due to the high circulating masses. The lower speed of the carrier finally set is adapted here to the greater time interval found between the products. In an extreme case the carrier itself is even brought to a standstill. Conversely, the carrier is set at a higher speed if photoelectric cell and pawl are shifted upstream.

The known device is thus a system which is relatively simple in operation, and the control of which reacts at differences in intervals at which products pass a detector. This also produces an inflexible system, with the disadvantage that synchronisation has to take place between the speeds of the multipack machine and the supply system. In practice, this means that a multipack machine has to be fed by a single-pack machine which is sitituated relatively close to it, and that the conveyor belts lying between them must be driven by the single-pack machine. However, an arrangement is commonly used in which a number of production or single-pack machines are set up in one room and feed the individual products by means of long conveyor belts moving at a constant speed to a multipack machine placed in another room. It is not uncommon here for said long conveyor belts to be fifty to one hundred meters or more long. The speed of such belts cannot be modulated. Moreover, this known system is unsuitable for products which do not tolerate being pushed together, or which cannot slide relative to the conveyor belt. If, for example, a group of flat products if forced against a carrier, the products will also slide over one another like ice floes. In the case of, for example, products adhering to the conveyor belt, such as pieces of cheese, forcing a group of products against a carrier is even impossible.

DE-A-3147590 discloses another system for grouping products supplied individually at a fixed pitch. The device to be used for this has two conveyor faces lying in line with each other and connecting to each other by means of a transition. This transition makes a periodic movement from one extreme position to the other, thus causing products to be pushed together, so that groups of products lying against each other are formed, alternating with a rapid return movement, by means of which a space is maintained between the groups. The disadvantage of this system is that the products have to be fed in at a constant pitch. Another disadvantage is the fact that the operation of the system may be changed only within certain limits, as a result of the use of a mainly mechanical, time-dependent control. The design is therefore relatively complex for such a limited operation. Furthermore, it is not possible to use this known system for processing, for example, products which do not tolerate being pushed together or are sticky and consequently cannot slide. Finally, it is only possible to form groups of products lying against each other with this known system.

Another, related field of application is placing at the same pitch products which have been fed in at random pitch. In a know system three conveyor belts placed in line with each other are used for this purpose. In this case the first conveyor belt, which has a smooth surface, moves considerably faster than the second conveyor belt with uneven surface connecting thereto. The result of this is that pushing together occurs on the first conveyor belt, so that products go up against each other. The third conveyor belt connecting to the second conveyor belt in turn moves faster than the second, with the result that the products go onto the third conveyor belt at a constant pitch. A carrier is then inserted between the products on that third conveyor belt, which carrier displaces a product and thereby places it in the correct position, in phase with the processing machine to which the products are being supplied.

This known system described above has a disadvantage on account of its great length, and also of the necessity for at least three conveyor belts and carriers. Besides, this known system is unsuitable if products which are difficult or impossible to slide, such as sticky products like pieces of cheese, are being conveyed. Flat products which cannot withstand being pushed together, such as chocolate bars, cannot be conveyed by this system either. This system is also unsuitable for products with variations in length, since this results in variation in the pitch on the third conveyor belt. Moreover, this system has disadvantages if the product pitch presents irregularities on the third conveyor belt, for example if products are not taken off the second conveyor belt properly because they have stuck to each other. The carrier in that case cannot be inserted between said products. Additional measures are then needed, since a packaging machine set up, for example, downstream of this system requires a supply of products with a regular product pitch. The relatively great length of the conveyor belt and the relatively great weight which is consequently in motion means that rapid variation of the speeds of the belt parts, called speed modulation, is particularly difficult, and therefore uncommon.

Such an irregularity in the product pitch is solved by, for example, interposed so-called acceleration or delay belts of relatively short length. This relatively short length means that the speed of such an interposed belt can be changed relatively quickly. However, a number—five or more—of such interposed belts are needed to eliminate relatively great irregularities, but it is not possible to use an unlimited number of such belts, while the costs increase proportionally with an increasing number of such interposed belts. Besides, such a system is relatively elongated, complex and susceptible to breakdowns.

A further field of application is a combination of the above-described fields of application: forming groups of products from a series of products fed in at random pitch, with the products within a group lying at a fixed (relatively) low pitch, while the pitch of the groups if greater again. In particular, for sticky products or products which cannot tolerate being pushed together, this field of application is also very problematical, as already explained above.

The object of the invention is to provide a method and a device for carrying out said method, by which the abovementioned disadvantages are solved effectively and efficiently. The aim here is to provide a particularly flexible control, by which the products, even sticky products or those which cannot withstand being pushed together, or products with differing dimensions, can be arranged in, for example, the following way:

products supplied at random pitch, discharged in groups with fixed pitch, in phase with the processing unit connected downstream;

products supplied at random pitch, discharged individually with fixed pitch, in phase with the processing unit connected downstream.

For this, a method according to the characterising part of claim 1 is proposed. Consequently, it is possible, for example, to feed in the products at a constant speed, which is desirable if great distances have to be bridged. In addition, with the activation element a rapid adaptation to changing product pitches is possible in a relatively simple way, as a result of the relatively low masses which can be moved at high speed. The adjustment of the speed of the products after passing the activation element does not have to take place as quickly, so that the forces developed as a result of the envisaged accelerations and delays can remain limited. This is of benefit in a relatively light construction.

With the method according to the present invention, after the product has passed the intended position, the place for the activation element for activating, for example, a carrier or for locating a belt transition, is calculated continuously from the position of the abovementioned product, which is clearly know from that moment. This provides a particularly flexible system with which any product stream with a limited irregularity can be processed, not only from a single-pack machine set up nearby, but also from very long conveyor belts moving at constant speed. A microprocessor system will be indispensable for carrying out the method.

Sub-claim 7 describes a preferred embodiment of a device for carrying out the method according to the invention. With it, products can be combined into groups by inserting carriers between the products. Although it is preferable to use a movable, pawl-type control element such as that described in the Dutch published unexamined application mentioned earlier, it is pointed out that the carriers can also be put into their working position in other ways, for example by means of a pneumatically, hydraulically or electrically driven control element.

Another embodiment of a device for carrying out the method is described in sub-claim 8. With it, it is possible to influence the stream of products without products being pushed together against a carrier, and without sliding the products along the conveyor. So the position of the transition can be adapted relatively quickly if, for example, the first conveyor is running at a different speed from the second conveyor and a irregularity is found in the product pitch between products moving upstream of the transition. This means that the moment at which a product arrives on the second conveyor from the first conveyor is shifted relative to the corresponding moment of the preceding products. This results in a local increase or reduction of the product pitch on the second conveyor compared with that on the first conveyor, depending on the direction and degree of displacement of the transition and the difference in speed between first and second conveyor.

This makes it possible, for example, to make a product stream with regular pitch from a product steam with irregular pitch, which is necessary for, for example, supplying a processing machine connected downstream, such as a packaging machine, and the products can also advantageously be placed in phase with said processing machine. It is also possible to form from a stream of products with a regular product pitch a stream of groups of products in the case of which the pitch between the groups of products is different from, for example greater than, the pitch between the products within a group. Combination of these two last-mentioned applications is also possible.

For the preferably fully automatic application of the method according to the invention, it is preferably upstream of the activation element to detect the position of a product and its product pitch with respect to an adjacent product. This is preferable in particular if the products are being supplied with an irregular product pitch. The displacement of the activation element is then determined on the basis of the deviation of said detected product pitch from the desired product pitch or reference pitch. For this, the data on the speed of the first and second track part, and the position of the transition and that of the product are also used. If, for example, groups of products have to be formed, all that is necessary is to detect the position of the first and/or last product from that group and to follow it for corresponding control of the transition. If the product pitch in the stream of products is very regular in this case, then it is not necessary to detect upstream, and control of the activation element depending on data from the drive alone may suffice.

It can happen that the products are fed in first at a smaller and subsequently at a greater product pitch. This may be due to the fact that, for example, the product manufacturing machine lying upstream slows down in production speed as time passes. In such a case it is preferable in particular during or after the displacement of the activation element to adjust the speed at which the products move along after passing the activation element. The position of the activation element can in this case be, for example, a measure of the conveyor speed.

With the invention it is possible to place the products or groups of products in phase with a processing machine disposed downstream, for example a packaging machine. This permits synchronisation between such a processing machine and the supply of products.

The invention will be explained in greater detail below with reference to a non-limiting example of an embodiment shown in the figures.

FIG. 5 shows diagrammatically a third embodiment of the device according to the invention, in side view; and FIG. 6 shows diagrammatically a chart for the operation of the device according to FIG. 5.

Figure 1:
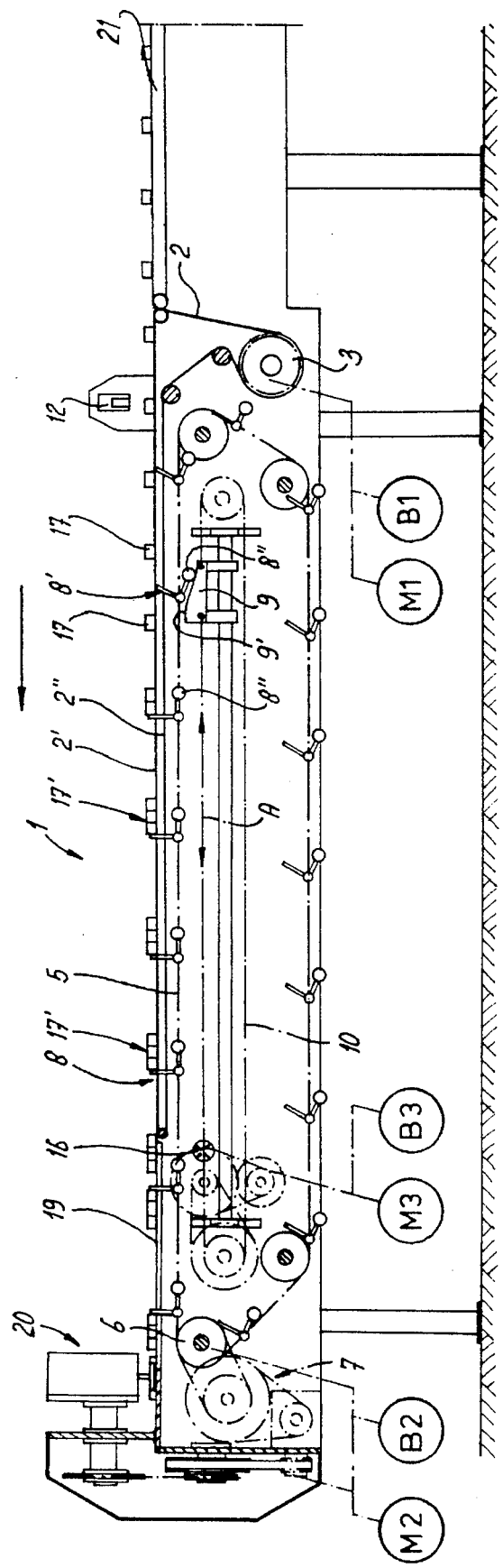
FIG. 1 shows in side view a first embodiment of the device for carrying out the method according to the invention.

FIG. 1 shows how the device 1 extends between a supply belt 21, on the right in the figure, which supplies a stream of individually packaged articles 17, and an inlet 20 of a packaging machine, on the left in the figure, which is not shown in any further detail, and which packages groups 17' consisting of three of these articles 17.

The device 1 comprises two adjacent conveyor belts 2, each having a top part 2' and a bottom part 2". These conveyor belts 2 are driven by means of the pulley 3. Said pulley 3 is in turn driven by a separate motor M1. This makes it possible to make the conveyor belts 2 run out of synchronisation with the supply belt 21.

The device 1 also comprises an endless chain 5, which is driven by means of the chain wheel 6, which is driven from the multipack machine 20 by means of the transmission 7. This transmission 7 is driven by motor M2. Carriers 8 are fitted at equal intervals on this chain 5. These carriers 8 can swing between a working position and a non-working position. In the working position, shown by reference number 8, the carriers project upwards through the space between the top parts 2' of the conveyor belts 2. In the non-working position, shown by reference number 8' the carriers do not project beyond the top parts 2'.

The carriers are moved out of the position 8' into the position 8 by means of the pawl 9, which is provided with a run-on face 9' up which the following roller 8" of the carrier 8 can run. The pawl 9 can be moved to and fro parallel to the conveyor belts 2 and chain 5 in the direction of the double arrow A by means of the endless toothed belt 10. The toothed belt 10 is driven here by a motor M3. A photoelectric cell 12 is fixed above the conveyor belts 2, at the beginning of the top parts 2', on the right in the drawing. A pulse generator B1 is connected to the motor M1; a pulse generator B2 to the motor M2; a pulse generator B3 to the motor M3. The function of these generators will emerge from what follows.

Pulse generator B1 gives, for example, ten pulses per mm displacement of an individual product 18. B2 gives, for example, 1,000 pulses per mm displacement of a group 17' of three articles. B3 is a position measuring element for the pawl 9.

Figure 2:
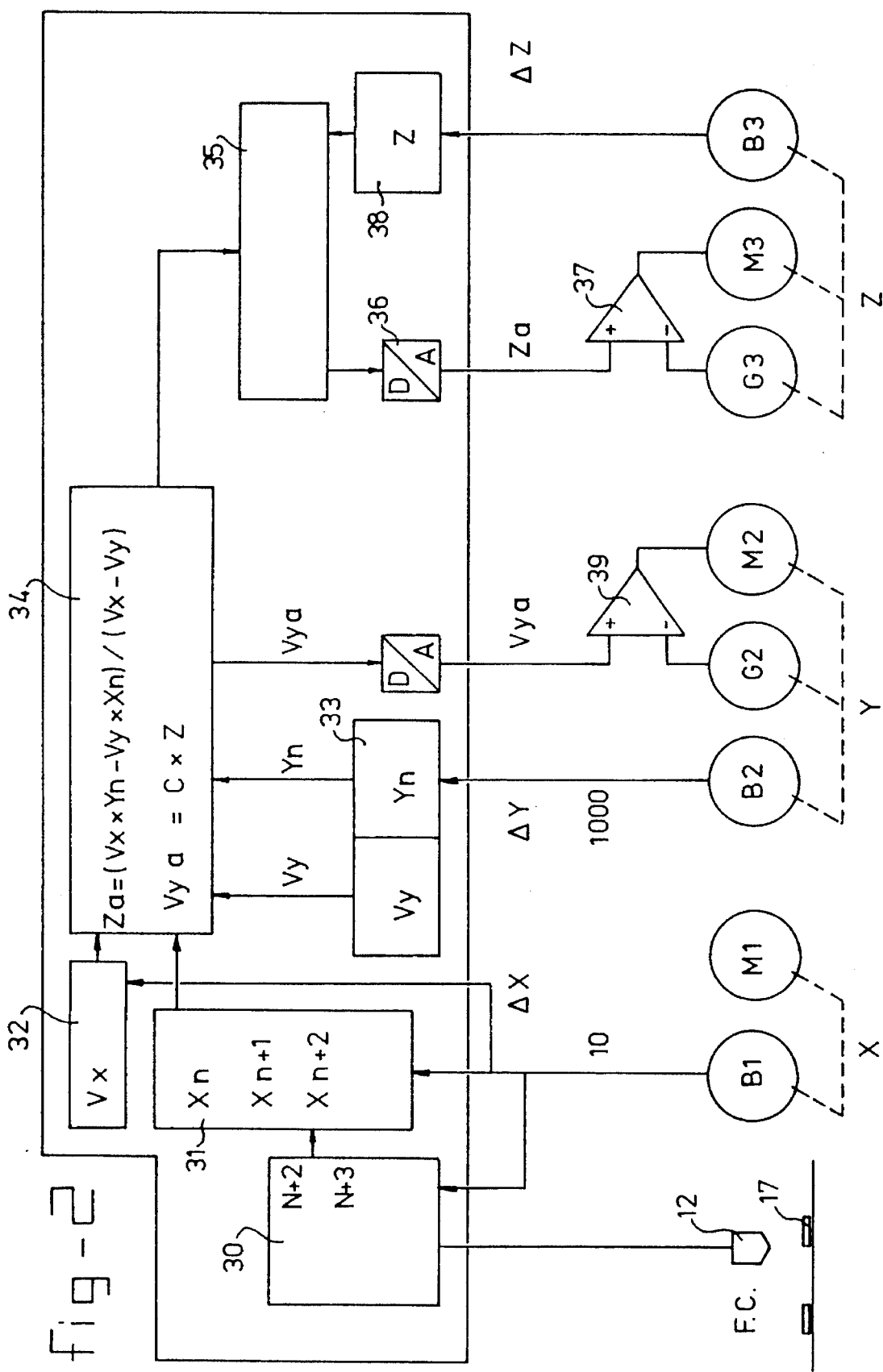
FIG. 2 shows a control flow chart for the device according to the invention.

Now with reference to FIG. 2, tacho-generators G2 and G3 are shown, coupled to M2 and M3 respectively. Reference number 30 indicates a product counter which is incremented to the desired number by a signal given in each case by the photoelectric cell 12, as a result of an article moving past it, following which a pulse is sent to counting register module 31, in which a following counting register is then started. The pulse emitted corresponds to the rear side of the last product of a group to be combined and, by incrementing the register with pulses from B1, the position Xn of this product is followed on the belt. At the same time, the belt speed Vx of the buffer belt is calculated in 32 with the signals coming from B1. B2 feeds counting register 33 in a corresponding way, but a larger number of incrementing pulses per group of combined products is sent out. The speed Vy of the buffer chain and the phase Yn of the carriers 8 and the packaging machine 20 operating in phase therewith are determined from them. The data concerning the required position Za of the pawl 9 are processed in the control unit 34, as is the required speed Vya of multipack machine 20 and the endless chain 5, and in connection therewith the shifting position of the carriers connected thereto. The control unit 34 sends a signal to the positioning unit 35 for positioning the pawl 9. This positioning unit 35 passes on the signals, by way of a digital-to-analogue converter 36, to the regulator 37 for controlling the motor M3. In connection therewith, B3 handles feedback of the position control of the pawl 9. The control unit 34 also regulates the speed of the endless chain 5 on the basis of the position regulation for the pawl 9 by means of regulator 39.

When the device is in operation a stream of individually packaged articles 17 is brought in by the supply conveyor 21. These articles are then transferred to the conveyor belts 2. When the photoelectric cell 12 is passed, said photoelectric cell emits a signal for each article which has passed, which establishes the size of the group. If, for example, each group of articles has to be made up of three of these articles, on each passing of three articles 17 moving along on the conveyor belts 2 a carrier 8 is set up through the fact that said carrier runs along the pawl 9. It is customary here for the endless chain 5, and thus the carriers 8, to move along at a speed which is lower than that of the conveyor belts 2. Three articles 17 are thereby combined in each case to a unified group 17' downstream of the carriers 8. At the end of the conveyor belts 2 the groups 17' are pushed onto a table 19. A group 17' formed downstream of a carrier is consequently pushed along over the table 19 by the following carrier. These groups of articles 17' are then transferred to the multipack machine 20.

Due to the fact that the passing of individual products is established by a fixed photoelectric cell 12, while both the speed of the conveyor belts 2 and the speed of the endless chain 5 are measured, the position of the beginning and/or the end of a group of products and also the position of a carrier are forecast in time, without speed synchronisation being necessary here. On the basis of these data, the position where the carrier must be activated can be determined. The pawl 9 is positioned with said data. The speed of the chain 5 is also regulated when there are great deviations in the supply of the individual products 17.

When the device shown begins to operate from stationary, a carrier 8 which is in the operating position is in the region of the end of the top part of the chain 5. The supply belt 21 is then set in operation, so that the supply speed thereof rises from 0 to the set capacity of, for example, five hundred and forth articles per minute. The conveyor belts 2 are also set in operation, while for the time being the chain 5, and thus the multipack machine lying downstream of it, remains at rest. The stream of articles supplied by the conveyor belts then passes the photoelectric cell 12. The number of products which is being combined in one group is counted here. At the same time, ten incrementing pulses are passed on to the counting register 31 for each mm of belt movement of the conveyor belts 2. The pawl 9 also lies at the end of the top part of the chain 5, thus on the left in the drawing. When the photoelectric cell 12 detects the passing of the last product of a group, two events take place simultaneously. First of all, the moment at which this last product from said group passes the carrier which is not in the active position, directly to the right of the active carrier in the drawing, is determined. At that moment the pawl 9 is moved over one carrier pitch in the upstream is placed in the working position after the first three articles. The endless chain 5 is likewise set in motion, and thus also the multipack machine. So long as the number of articles 17 arriving per unit time at the beginning of the top parts 2' is greater than the number of articles going out in group 17' at the end of the parts 2', the pawl 9 will be moved further upstream. This continues until a balanced situation is reached, in which the pawl 9 lies round about halfway along from the reversing end of the endless chain 5. In that situation the endless chain 5 is still moving more slowly that the conveyor belts 2. If the product pitch of the last product from the group is now suddenly greater than the average product pitch, placing the carrier in the working position will have to take place later in terms of time, and thus more to the left in FIG. 1. The pawl 9 is accordingly moved to the left in FIG. 1. The speed of the endless chain 5 is adjusted at the same time. It speed is reduced for adapting it to a lower product supply in terms of time. If, for example, there is temporarily no further supply of products, the endless chain 5 will in the end come to a standstill. For the design of the carrier 8 and the pawl 9 you are referred to the Dutch published unexamined application mentioned earlier.

Figure 3:
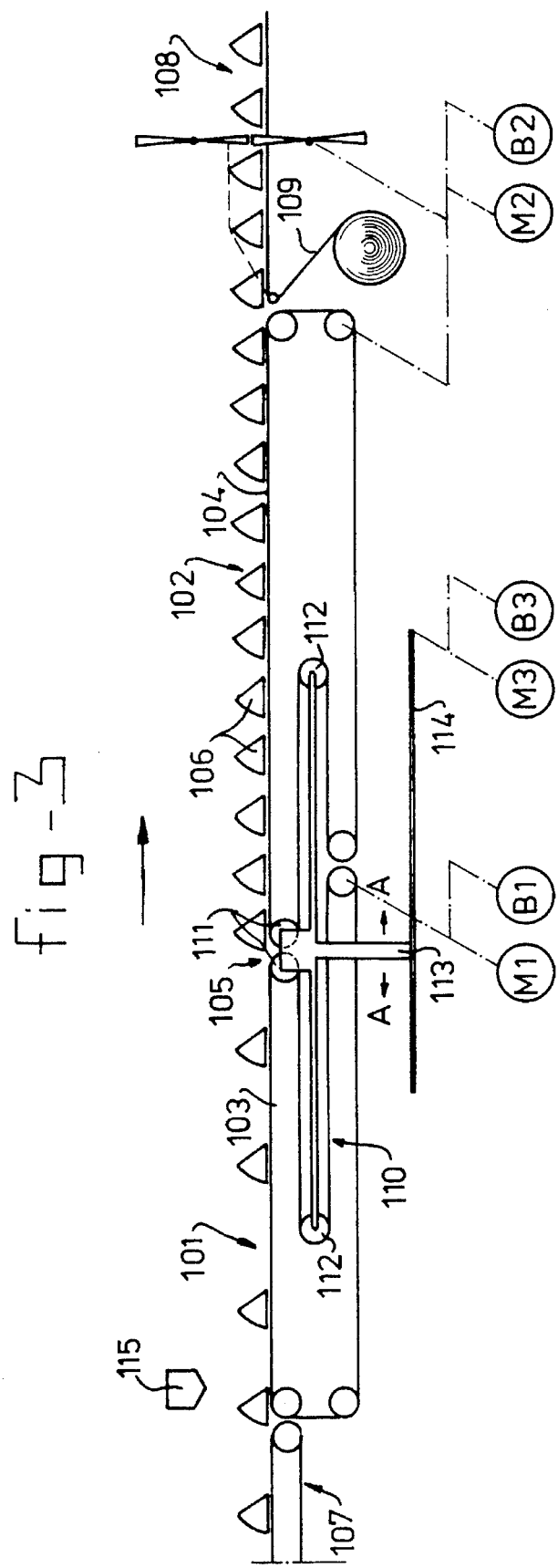
FIG. 3 shows diagrammatically a second embodiment of the device according to the invention, in side view.

FIG. 3 relates to a second embodiment of the invention. It shows in side view a first conveyor belt 101 and a second conveyor belt 102, of which the top parts 103 and 104 respectively lie in line with each other and connect to each other at the transition 105. Products 106 (pieces of cheese) are moved along these top parts 103, 104 from left to right in the drawing. The products 106 are fed in here by a conveyor belt 107 from a production machine (not shown) to the conveyor belt 101, and at the end of the top part 104 of the conveyor belt 102 is a packaging machine 108 which is synchronised with the conveyor belt 102, and which packages the products 106 individually in a film 109. Due to the fact that the speed of the conveyor belt 101 is higher than that of the conveyor belt 102, the product pitch on the conveyor belt 102 is smaller than that on the conveyor belt 101. In order to rule out irregularities in the product pitch, the transition 105 between the top parts 103, 104 is designed so that is can be moved parallel to the direction of movement of the products 106 in the direction of the arrows A. For this, the top parts 103, 104 can be lengthened or shortened. This is achieved by guiding the conveyor belts 101, 102 outside the region of the top parts 103, 14 in a U-shaped path 110 (also known as a pull-nose construction), and the guide elements 111 at the ends of the top parts 103, 104 in the region of the transition 105, at the ends of the top parts 103, 104 in the region of the transition 105, in addition to the guide elements 112 in the bend of the U-shaped path 110, are designed so that they can be moved in common to and fro, in the direction of the arrows A. For this purpose, these guide elements 111, 112 are fixed to a common spindle 113. This spindle is movable in the direction of the arrows A by means of the drive mechanism 114. A photoelectric cell 115 is provided at the end of the top part 103 of the conveyor belt 101 facing away from the transition 105, for detecting the position of a product 106 and also the product pitch between two adjacent products.

Figure 4:
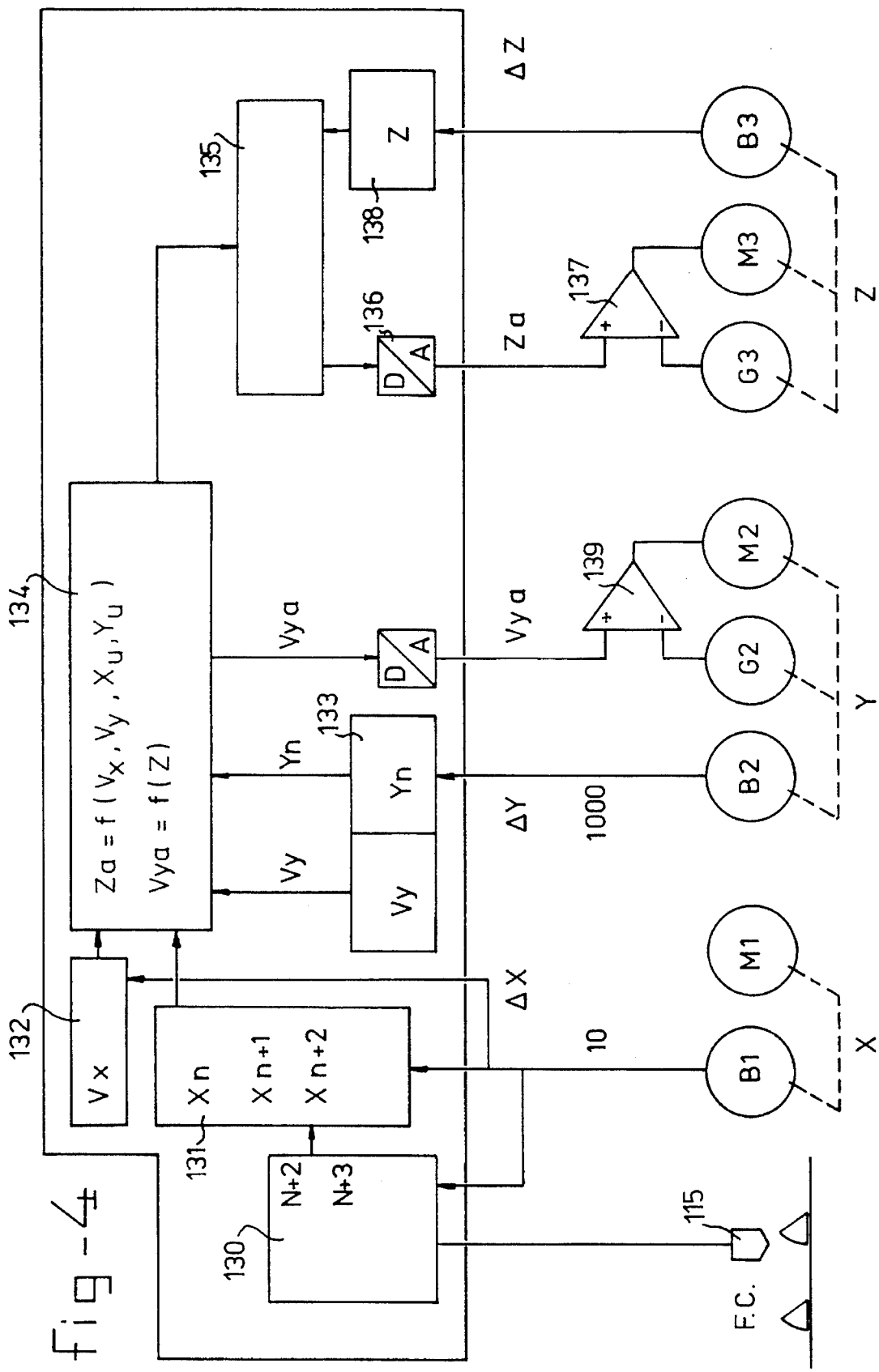
FIG. 4 shows diagrammatically a chart for the operation of the device according to FIG 3.

Now with reference to FIG. 4, the device words by the same procedure as that of the first embodiment described above with reference to FIGS. 1 and 2, as follows: When the device is in operation a stream of individual articles 106 is supplied by the supply conveyor 107. They are then transferred to the top part 103 of the conveyor belt 101. When they pass the photoelectric cell 115, the latter emits a signal for each product which has passed. This signal is passed on to a product detector 130, which sends a pulse to a counting register module 131, in which a following counting register is then started. The counting register 131 is incremented by the pulse generator B1 connected to the motor M1 by which the conveyor belt 101 is driven, with the result that the position of the product detected by the photoelectric cell 115 is followed on the belt. At the same time, the belt speed ($V_x$) of the conveyor belt 101 is calculated in 132 by the signals combing from B1. In a corresponding way the pulse generator B2, which is connected to the motor M2 for synchronous driving of both the conveyor belt 102 and the packaging machine 108, supplies a counting register 133. The speed $V_y$ of the conveyor belt 102 and the position $Y_n$ of the packaging machine 08 are determined from this. The data concerning the required position of spindle 113 (Za), and thus the belt transition 105, and the required speed Vya of the conveyor belt 102, are processed in the control unit 134. The belt transition thus ensures that the products are not only placed at the correct pitch, but are also synchronised with the packaging machine 108. The required speed $V_{ya}$ is compared in the regulator 139 with the speed $V_y$ of the conveyor belt 102, which is determined by means of the tacho-generator G2. If there is a deviation, the operation of the motor M2 is adjusted. The control unit 134 also sends a signal to the positioning unit 135 for positioning the spindle 113. This positioning unit 135 passes on the signals by way of a digital-to-analogue converter 136 to the regulator 137 for controlling the motor M3 for moving spindle 113. The tacho-generator G3 provides the comparison signals. In conjunction therewith, pulse generator B3, by means of read-out unit 138, ensures feedback of the position regulation of the spindle 113. The speed of the conveyor belt 102 is controlled by said position regulation of the spindle 113.

If it is found that the pitch between two adjacent products is, for example, greater than usual, at the moment when the transition 105 is situated between said two products 106, it is moved in the downstream direction, to the right in the drawing. In this way the product 106 on the conveyor belt 101 has time to catch up with the preceding product 106 on the conveyor belt 102, so that the product pitch concerned is adapted again to the usual product pitch. At the same time, an adjustment—albeit a delayed one—is made to the speed of the conveyor belt 102 relative to that of the conveyor belt 101. This is necessary if the product pitch of all following products is also greater to approximately the same degree. Otherwise, the spindle 113 must in fact be moved increasingly further to the right until it is at the end of its path, following which the system can no longer function properly. If the speed difference between the two conveyor belts 101, 102 is also adjusted, an automatic regulation to a new usual product pitch thus takes place.

FIG. 5 shows how products can be grouped together by essentially the same device as that shown in FIG. 3. In the example shown the products 106 are supplied at a very regular product pitch to the conveyor belt 101 by means of an infeed chain 107. By means of the device according to the invention, these products are divided into groups 116, each with four products. At the end of the conveyor belt 102 these groups 116 are removed by a discharge chain 117. The conveyor belts 11, 102 and the chains 107, 117 are driven in synchronism by means of a common motor M2. The spindle 113, which is driven by motor M3, is controlled by means of a pulse generator B2 connected to said motor M2. When the last product 106 from a group 116 has passed the transition 105, the spindle 113 is moved to the right in the drawing, so that the pitch between the last product of said group and the first product of the group following it is increased. A particularly simple control of the spindle 113 is obtained through the very regular feed of the products.

The control of the device shown in FIG. 5 is explained further with reference to FIG. 6. The number P of products to be combined into a group is entered in register 140. The pulse generator B2 connected to the motor M2, by which both chains 107, 117 and also the conveyor belts 101, 102 are driven in synchronism, supplies counting register 133. This counting register determines the speed of the products 106 and the position of the chain 117. The position of the spindle 113 is calculated in the control unit 134 on the basis of the data entered from 133 and 140. The spindle 113 is controlled by means of positioning unit 135, as described with reference to FIG. 2. The speed of the processing machine (not shown) connected downstream is measured by means of a potentiometer 141 and compared in comparator 139 with the speed of the motor M2 by means of tacho-generator G2.

Of course, there are also other embodiments of the invention. For example, it is possible to combine the placing of the products at a regular pitch, as described in FIG. 3, and the dividing of the products into groups, as described in FIG. 5. The regulators shown in FIGS. 4 and 6 must be combined in that case, pulse generator B2 thus supplying two counting registers, or a combined counting register for carrying out both calculations. The movement of the transition 105 can also be achieved in a different way, for example by fitting the conveyor belts 101, 102 one above the other, so that it is even unnecessary to make both conveyor belts capable of being shortened or lengthened. In that case, the top part 103 of the conveyor belt 101 is, for example, designed in such a way that is partially overlaps the top part 104 of the conveyor belt 102. The top part 103 of the conveyor belt 101 is then merely varied in length in order to move the transition 105.

It is important that the product should be followed constantly after passing a certain position, and that, depending on the position of the product, the phase of the processing unit connected downstream and the speeds of the products upstream and downstream of the activation element, the required position of said activation element and the speed of the products after passing the activation element are determined, following which the prevailing conditions are adapted to the required condition, in order to bring the products, possibly combined into groups, into phase with the unit connected downstream. The invention thus provides a very flexible method, and the device according to the present invention provides a system which reacts quickly and satisfactorily.

The invention is therefore defined further by the appended claims.

I claim:

1. A method for arranging a series of products (17, 106), moving in succession in a downstream direction along a conveyor (2, 103, 104) at an essentially constant first speed, said products passing a controlled activation element (9, 113) which is movable parallel to the products, and by means of which said series of products can be arranged, said element is controlled depending on a predetermined product upstream of the element passing a certain position (12, 115), and said products, on passing said element, move along at an essentially constant second speed, and are arranged depending on a product processing unit (20, 108) situated downstream and operating in phase with the second speed; before the abovementioned detected product passes the element, measuring the first speed Vx and second speed Vy, the position Yn of the product processing unit and the position Z of the element, determining the distance Xn covered by the abovementioned detected product from the abovementioned position, calculating the required position Za of the element (9, 113) and also the required speed Vya from Vx, Vy, Xn and Yn, comparing the measured position Z and also the measured second speed Vy with the required position Za and the required second speed Vya, and if there is a deviation between the measured position Z and the required position Za or the measured speed Vy and the required speed Vya, moving the element or changing the second speed Vy.

2. Method according to claim 1, further comprising calculating the required position Za according to $Za=(Vx*Yn-Vy*Xn)/(Vx-Vy)$, and calculating the required second speed Vya according to $Vya=C*Za$, in which C is a constant.

3. Method according to claim 1, further comprising counting the number of products passing the element (9, 113), after a predetermined number of products has passed, moving said element at a speed at least equal to the abovementioned first speed downstream and then upstream until it is substantially in the starting position Z, corrected if necessary to the required position Za, and the counting of the products begins again.

4. Method according to claim 3 in which through the first signals a third counting register combined with the second counting register (33, 133) increments, and when this counting register reaches a certain value the abovementioned control of the element starts the element (9, 113), and resetting the counting register.

5. Method according to claim 1, in which after the abovementioned position (12, 115) is passed by the product, giving first signals for each unit of displacement of the product downstream of the element (9, 113), which the result that a first counting register (31, 131) increments by a predetermined value, determining by said first counting register the first speed Vx and also the total displacement Xn of the product after passing the position (12, 115), and giving second signals per unit of displacement of the products downstream of the element (9, 113), with the result that a second counting register the second speed Vy and also the degree Yn to which the situation of the product processing unit is changed after the product has passed the position.

6. Device for carrying out the method according to claim 1, comprising first (M1) and second (M2) drive elements for moving the products along at a first and second speed, third drive elements (M3) for controlling the activation element (9, 113), detection means (12, 15) for establishing that the product has passed the position, pulse generators (B1; B2; B3) and tacho-generators (G2; G3) coupled to the drive elements (M1; M2; M3), counting registers (131; 133) connected to the pulse generators, a computing unit (34, 134) to which the counting registers (131; 133) and the detection means (12, 115) are connected, and a first comparator (39, 139) and a second comparator (37, 137), which are connected to the computing unit (34, 134) and to the tacho-generator (G2), (G3), and regulate the drive elements (M2) and (M3) respectively.

7. Device according to claim 6, comprising a drivable conveyor belt unit (2) and a drivable endless chain (5), on which a number of carriers (8) distributed at equal pitch over the chain are fitted, the working part (2') distributed at equal pitch over the chain are fitted, the working part (2') of the conveyor belt unit running at a distance from and substantially parallel to the working part of the abovementioned endless chain, while the carriers (8) of said chain are fitted thereon so that they are movable in such a way that they are placed in a projecting position relative to the abovementioned part of the conveyor belt unit only after passing the activation element (9), in which position they project between products (17) lying on that part of the conveyor belt unit, while the detection means (12) are fitted upstream of the activation element, the drive elements (M1) and their pulse generator (B1) are coupled to the conveyor belt unit (2), the drive elements (M2) and their pulse generator (B2) and the tacho-generator (G2) are coupled to the chain (5), and the drive elements (M3) and their pulse generator (B3) and the tacho-generator (G3) are coupled to the activation element (9).

8. Device according to claim 6, comprising a first endless conveyor belt (101) lying upstream and a second endless conveyor belt (102) lying downstream thereof, which conveyor belts are guided around guide elements (111, 112), and of which the top parts (103, 104) lie substantially in line with each other and connect to each other at a transition (105), and comprising a detection device (115) upstream of the transition (105), the guide elements of at least one of the first and second conveyor belts at the end of the top part lying at the transition being connected to the activation element (113) and being movable to and fro in the length-wise direction of the top part, while at least one of the first and second endless conveyor belts can be lengthened or shortened, the first conveyor belt (101) is coupled to the first drive elements (M1) and the pulse generator (B1), the second conveyor belt (102) is coupled to the second drive elements (M2) and their pulse generator (B2) and the tacho-generator (G2), and the activation element (113) is coupled to the third drive elements (M3) and their pulse generator (B3) and the tacho-generator (G3).

\* \* \* \* \*